United States Patent [19]
Williams

[11] Patent Number: 5,926,795
[45] Date of Patent: Jul. 20, 1999

[54] SYSTEM AND APPARATUS FOR DISPENSING COUPONS HAVING SELECTIVELY PRINTED BORDERS AROUND PREFERRED PRODUCTS

[75] Inventor: Eric Williams, Tampa, Fla.

[73] Assignee: Catalina Marketing International, Inc., St. Petersburg, Fla.

[21] Appl. No.: 08/953,646

[22] Filed: Oct. 17, 1997

[51] Int. Cl.⁶ ........................ B42D 15/00
[52] U.S. Cl. .............. 705/14; 705/16; 705/20; 705/408
[58] Field of Search .............. 705/14, 16, 17, 705/20, 408, 410

[56] References Cited

U.S. PATENT DOCUMENTS

| | | |
|---|---|---|
| 4,444,819 | 4/1984 | Maruta et al. . |
| 4,551,738 | 11/1985 | Maruta et al. . |
| 4,674,041 | 6/1987 | Lemon et al. . |
| 4,703,423 | 10/1987 | Bado et al. . |
| 4,723,212 | 2/1988 | Mindrum et al. . |
| 4,800,192 | 1/1989 | Tamagawa et al. . |
| 4,825,045 | 4/1989 | Humble . |
| 4,833,308 | 5/1989 | Humble . |
| 4,910,672 | 3/1990 | Off et al. . |
| 5,173,851 | 12/1992 | Off et al. . |
| 5,176,224 | 1/1993 | Spector . |
| 5,305,197 | 4/1994 | Axler et al. . |
| 5,353,218 | 10/1994 | De Lapa et al. . |
| 5,401,060 | 3/1995 | Chang et al. . |
| 5,459,306 | 10/1995 | Stein et al. . |
| 5,502,636 | 3/1996 | Clarke . |
| 5,557,721 | 9/1996 | Fite et al. . |
| 5,822,735 | 10/1998 | De Lapa et al. ............ 705/14 |

*Primary Examiner*—Thomas R. Peeso
*Attorney, Agent, or Firm*—Oblon, Spivak, McClelland, Maier & Neustadt, P.C.

[57] ABSTRACT

Apparatus and a corresponding method for creating a coupon or other like incentive in response to a transaction. A record pertaining to the details of the transaction is examined to determine whether the transaction is intended to trigger the creation of a coupon or other like incentive having a border. The non-existence of a certain detail of the transaction examined will result in creation of a coupon or other like incentive having a border. Also, the existence of a certain detail of the transaction examined will result in the creation of a coupon or other like incentive having a border. Transactions that do not trigger the creation of a coupon or other like incentive having a border may result in creation of coupons or other like incentives not having borders or in creation of a transaction receipt not having a border.

5 Claims, 8 Drawing Sheets

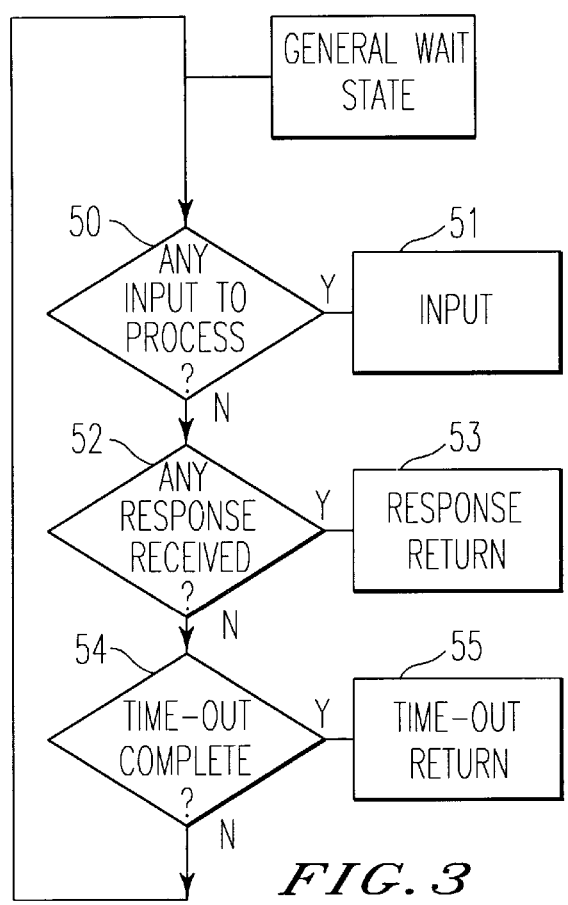
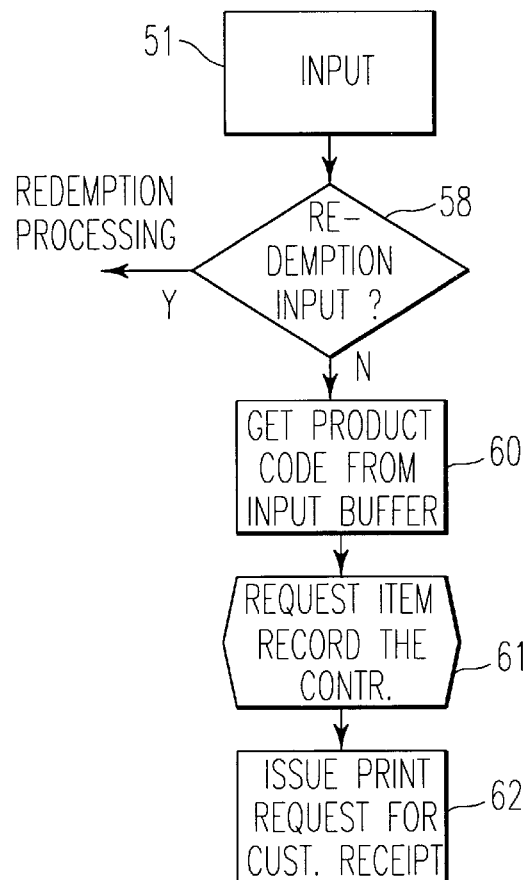
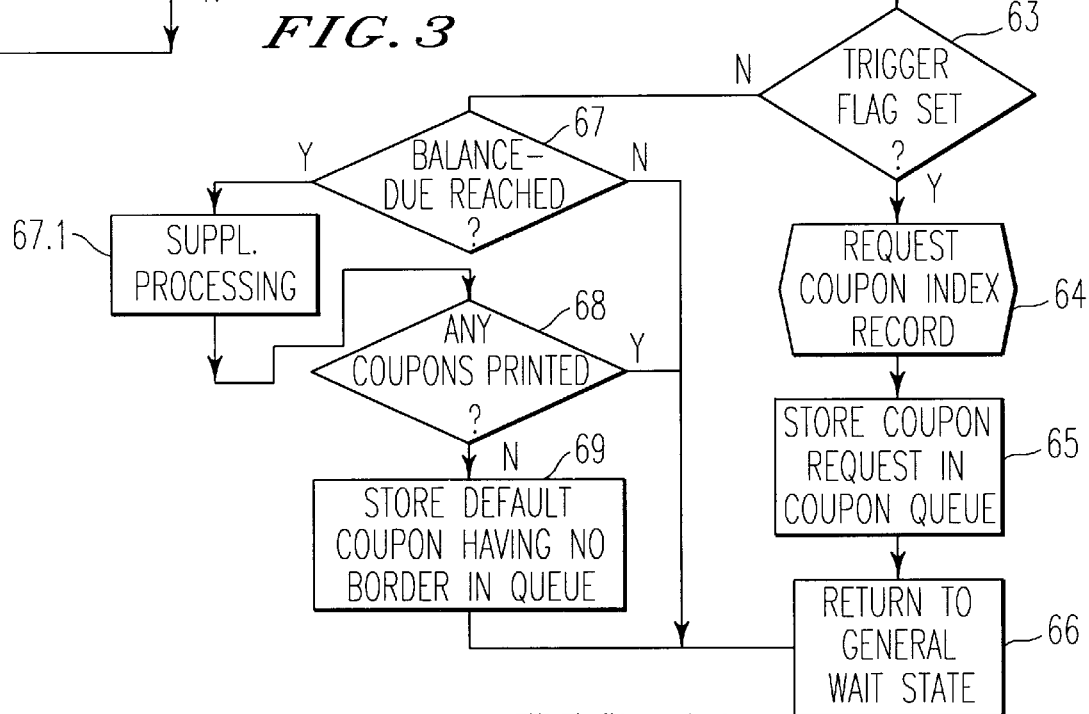
FIG. 3
FIG. 4A

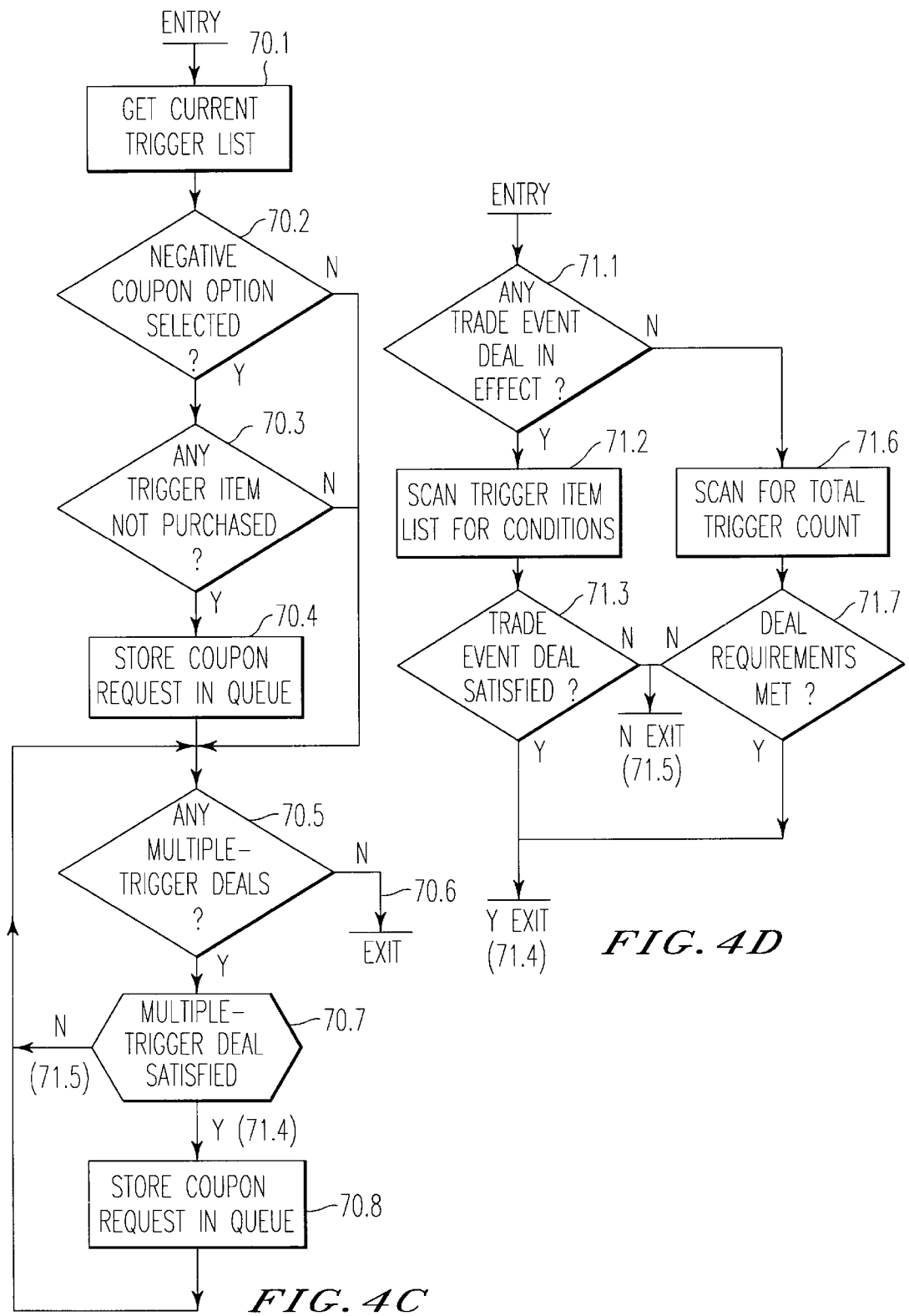

SYSTEM AND APPARATUS FOR DISPENSING COUPONS HAVING SELECTIVELY PRINTED BORDERS AROUND PREFERRED PRODUCTS

CROSS REFERENCES TO RELATED APPLICATIONS

The present invention is related to commonly owned U.S. Pat. Nos. 4,723,212, 4,910,672, 5,173,851, and 5,612,868, all of which are incorporated herein by reference.

BACKGROUND OF THE INVENTION

1. Field of the Invention

This invention relates generally to any transaction where a receipt is printed. Based on the details of the transaction, a coupon or other like incentive is printed out of the transaction device. The coupon or other like incentive has a security element such as a border or watermark, whereas the receipt does not have such a security element.

In one specific embodiment this invention relates generally to point-of-sale computer systems of the type used in retail stores to record sales transactions. More particularly, the invention relates to point-of-sale systems capable of handling discount coupons having borders or not. Most point-of-sale systems have terminals that are capable of reading a code printed on each product package and thereby determining the price from an internal file stored at a store controller. Products are coded by means of a series of parallel lines, in accordance with a convention known as the Universal Product Code.

2. Discussion of the Background

As every grocery shopper knows, many manufacturers distribute discount coupons or like incentives for their products, either through the mail, by printing them in newspapers or magazines, or by enclosing them in similar or related product packages. When a customer presents a discount coupon at the time of purchase of an appropriate product, typically the grocery checker operating the terminal will scan the coupon, and the discount will be subtracted from the customer's bill. While the above-described method or system assists in the speed and accuracy of the transaction, the transaction is not limited to such a method or system.

While a number of different methods may be used to redeem coupons or other incentives within a retail location; a more important disadvantage with coupons are the systems of distribution. In specific, most coupons for a particular product are distributed to a person who already purchases the same or a related product. From a marketing standpoint, this is contrary to the usual goal in any marketing campaign: to increase the number of customers who buy a particular product, by adding new customers. People who have already bought the product are clearly not new customers. And people who collect coupons from newspapers and mailings typically fall into a very narrow group. First, they are part of a group of people who are motivated to collect coupons of any kind, usually for economic reasons. More importantly, customers who collect and redeem a particular coupon will usually have had some prior knowledge of the product—i.e., they are probably not "new" customers.

Various other strategies are used to reach new customers. These include mass mailings of free samples of the product, together with discount coupons, and mass media advertising. Free samples of some types of products cannot be conveniently mailed, however, and many potential new customers may still ignore the mailing. Likewise, mass media advertising may fail to reach a potential new customer, or convince him or her to try a new product, especially if he or she is already relatively satisfied with a competitive product.

Ideally, what is needed from a marketing standpoint is some way of putting an eye-catching discount coupon for a selected product or other like incentive in the hands of a customer who uses some other product.

Furthermore, security concerning the authenticity of the redeemed coupon or other like incentive is a major issue of concern to retailers and manufacturers. Currently, standard coupons and the like, especially those which are black and white, are susceptible to duplication by photocopying and to being knocked-off by a person printing likenesses of the coupon or the like, and thereafter tendering the likeness for redemption. Thus, the cost of a promotional campaign by a retailer and/or a manufacturer can be quite large.

Ideally, what is needed from a marketing standpoint is some way of producing a discount coupon or other like incentive that is not susceptible to being easily duplicated or knocked-off and placing these incentives in the hands of consumers which purchase some other product.

SUMMARY OF THE INVENTION

The present invention provides an apparatus, and a related method, for printing a discount coupon or other like incentive at a transaction terminal. In general terms, the apparatus of the invention comprises means for identifying a triggering transaction and means for printing a coupon or other like incentive having a border with or without a watermark. The bordered incentive or coupon is printed in response to the nature of the transaction—i.e., products purchased or not purchased, cash tendered for payment, or a credit or debit card, etc. The color of the border can be any color. Other non-triggering transactions can result in the printing of coupons or other like incentives not having borders. Also, in both scenarios, the transaction receipt can be printed without a border from the same printer that printed the coupons and other like incentives having borders.

Another embodiment of the present invention provides an apparatus, and a related method, for printing a redeemable discount coupon at a point of sale terminal. In general terms, the apparatus of the invention comprises means for identifying a triggering product in a customer order, means for associating the triggering product with a coupon deal, and means for automatically printing at least one discount coupon having a border. The coupon having a border is printed in response to either (1) the purchase of a certain product or (2) the fact that the customer did not purchase a certain product or (3) other triggering aspects of the order have been met such as type of tender type or amount, loyalty card use, etc. Other coupons which are not triggered by products bought or not bought can be printed which do not have a border.

More specifically, the means for identifying a triggering product includes (1) an item file with a triggering field contained within each product record and (2) means for checking the triggering field as each product purchase is processed. The means for associating the triggering product with at least one coupon deal includes a file of coupon index records (1) for which access is obtained by item code and (2) which contains for each triggering product at least one link to a coupon deal file. Each record of the coupon deal file contains details of a coupon deal, including its value, period of validity, and a code identifying the family of products to which the coupon deal applies. The means for printing the coupons includes (1) means for determining a printing priority and (2) a printing device capable of reproducing a bar type code in uniform product code format.

A "negative" coupon is a coupon that is printed in response to the failure of a customer to purchase a selected trigger item. A "multiple-trigger" coupon is a coupon that is printed in response to the purchase of more than one triggering item in a single transaction. One category of multiple-trigger coupons is the "heavy-user" type, in which a customer who purchases multiple items is rewarded with a discount coupon, the value of which is selected to be dependent on a total number of items purchased. Another category of multiple-trigger coupons is a "trade event" coupon, the printing of which is conditioned on the customer's having purchased multiple items in a predefined trade group of products. The trade groups may be defined by a product manufacturer or by the store.

Briefly, in relation to the negative coupon printing feature, the system of the invention includes (1) a plurality of terminals at customer check-out locations, each having means for reading product codes on purchased items in a customer order, (2) a store controller with which the terminals can communicate, the store controller having access to an item record file containing price and other information for each product item, (3) means for storing the terms of at least one coupon deal in which the printing of a discount coupon for a selected product will be triggered by the failure of a customer to purchase at least one triggering product, (4) means for identifying triggering products in the customer order, (5) means for associating triggering products with a coupon deal, and (6) means for automatically printing at least one discount coupon having a border, based on the details of the coupon deal and without the intervention or participation of the customer other than in failing to have purchased triggering products.

The printing of a coupon having a border or no border is achieved by utilizing paper having a thermally activated dye or chemical border which will change color upon the selective application of heat to produce an outline around coupons for the products of preferred manufacturers or suppliers. The system of the subject invention may therefore print coupons at a check-out station having a border or the like around preferred products in response to the purchase of a competing supplier's product and/or the failure to purchase products of preferred suppliers. If it is desired that the coupon to be printed not have a border, heat is not applied to the paper in the region of the borders, and the printer therefore prints a coupon with a white border. Also, no border is printed when the receipt is printed. This arrangement permits the use of one roll of paper without having to repeatedly change between paper rolls having a border and paper rolls which do not have a border.

The invention also comprises the steps of (1) identifying a triggering product from among a sequence of products purchased by a customer, (2) associating the triggering product with at least one coupon deal, and (3) automatically printing a machine-readable coupon having a border for the customer. More specifically, the step of associating the triggering product with a coupon deal includes the steps of (1) accessing a coupon index record by means of a product item code of the triggering product, the product index record containing one or more coupon look-up members; then (2) accessing a coupon deal record by means of each of the coupon look-up members in the coupon index record. Each coupon deal record contains all of the information necessary to print a coupon either having a border or not having a border, and the only remaining steps in coupon creation are extracting the coupon information from the coupon deal record and printing the coupon.

It will be appreciated from the foregoing that the present invention represents a significant advance in the field of retail point-of-sale systems. In particular, the invention provides a technique for creating discount coupons or other like incentives which may or may not have borders depending on the purchase or non-purchase of certain products or other triggering elements on the same printer designed for printing customer receipts.

The printing of a coupon or other like incentive having a border or no border is achieved by utilizing paper having a thermally activated dye or chemical border which will change color upon the selective application of heat to produce an outline around coupons for the products of preferred manufacturers or suppliers. This design allows a single paper supply to produce coupons or incentives, with or without a border, as well as any format of a standard customer purchase receipt. Since any number of chemical agents can be impregnated in the paper stock, any color combination can be generated for any number of product formats.

The purchase or non-purchase of products that trigger the creation of the coupon having a border highlight the preferred product presented on the discount coupon, thus attracting the attention of the customer. Additionally, the border makes it more difficult for a person (1) to photocopy the coupon or incentive or (2) to make a likeness of the coupon or incentive using a printer. Thus, the use of a border provides security to the retailer and the manufacturer against the redemption of unauthorized coupons or other like incentives.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a simplified flow chart showing the functions performed in a general wait loop of the terminal program;

FIG. 4a is a simplified flow chart showing the functions performed at a checkout terminal during coupon creation;

FIG. 4c is a simplified flow chart showing additional functions performed in input processing, to process negative coupon deals and multiple trigger item coupon deals;

FIG. 4d is a simplified flow chart showing the functions performed in FIG. 4c in determining whether multiple trigger coupon deals have been satisfied;

DESCRIPTION OF THE PREFERRED EMBODIMENTS

Overview

Figure 1:
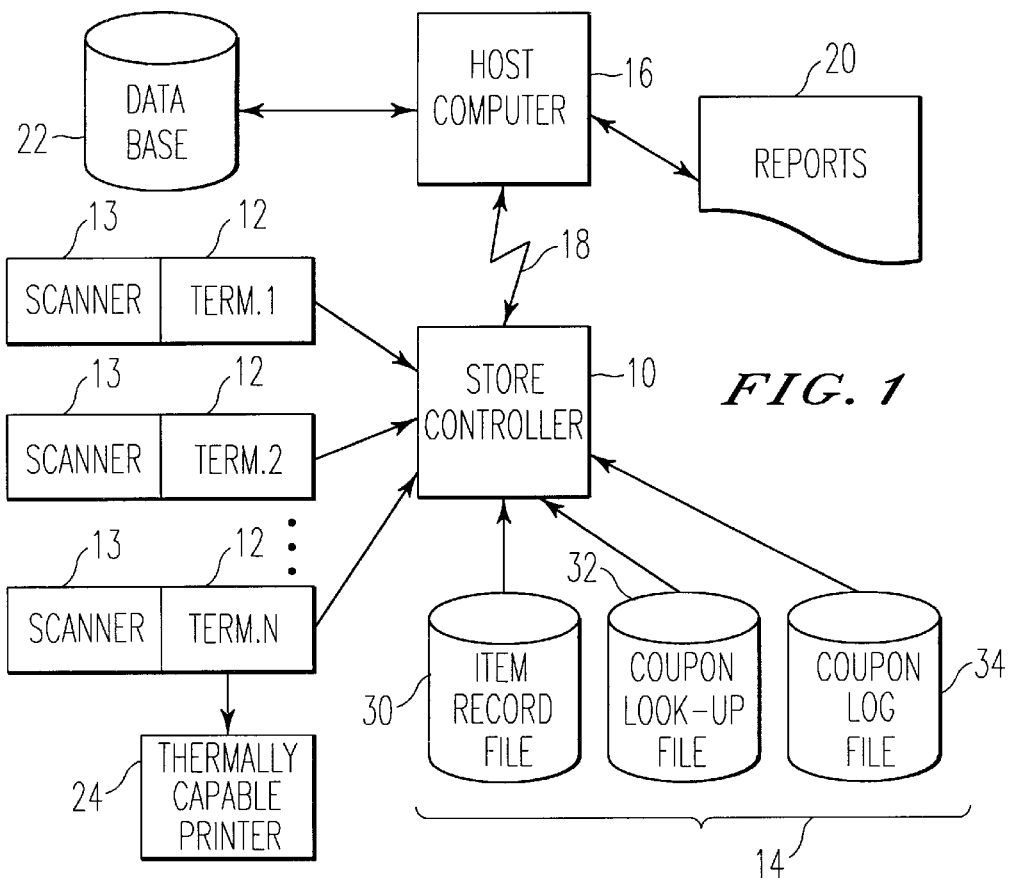
FIG. 1 is a simplified block diagram showing the apparatus of a point-of-sale computer system for use in a retail store.

Referring now to the drawings for purposes of illustration, wherein like reference numerals designate identical or corresponding parts throughout the several views, the present invention is concerned with point-of-sale systems for recording sales transactions involving the creation of discount coupons or other like incentives either having borders or having no borders.

FIG. 1 shows in broad outline the components of such a system. In each store in which the invention is to be used, there is a store point-of-sale controller, indicated by reference numeral 10, and a plurality of checkout terminals 12, each having an associated optical scanner 13. Associated with the controller 10 are a number of files, indicated at 14. The files 14 are used by the controller 10 to provide information to the terminals 12. In a typical point-of-sale system, the files 14 contain a record for each product in the store, and then are used to access price and other information concerning the product.

The controller 10 is coupled to a retailer host computer 16, as indicated by line 18. The line 18 may be a telephone line or some other communication link. The retailer host computer 16 controls communications with all store controllers 10 in the retailer's various stores, and it is responsible for generating various accounting reports, as indicated at 20. The retailer host computer 16 has an associated data base 22 of various files relating to the retailer's entire store operations.

Point-of-sale systems of the general type described above are not normally equipped to handle discount coupons, except in the sense that checkers at the terminals 12 can scan the coupon to be discounted from a customer's bill. However, in accordance with the present invention, at least one of the checkout terminals 12 has associated with it a thermally capable coupon printer 24, and the system includes means, to be described, for identifying a triggering product among the items listed in the customer's bill. A triggering product is one that has been selected to trigger or to be one element in triggering the printing of a coupon. Typically, however, each checkout terminal has a thermally capable printer integrally assembled thereto. The thermally capable printer can print both types of coupons and the transaction receipt.

The files 14 associated with the store controller 10 include an item record file 30, a coupon look-up file 32, and a coupon log file 34. The item record file 30 is a standard price file used in point-of-sale systems, except that it includes a trigger flag, which is an additional one-bit field. There is also room in the item record for two fields known as family group codes. A family group code is a three-digit number assigned by the product manufacturer to identify the product as belonging to a particular group of products. A single product may belong to (1) two such groups or (2) more than two such groups if an extended record format is used. As will be discussed in more detail below, the family group codes are used in the coupon validation process, in which a coupon presented for redemption is examined for validity in relation to a particular customer's bill. For example, a particular coupon may be valid for a family group comprising all different sizes of a product package.

Figure 2:
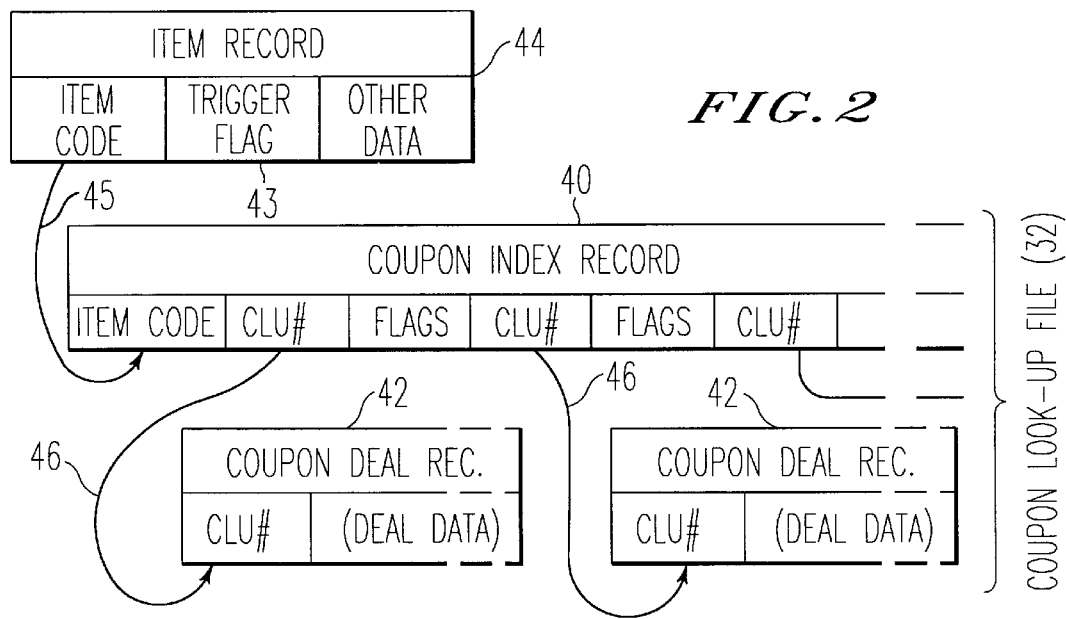
FIG. 2 is a block diagram illustrating interrelationships between the principal files used in the apparatus of the invention.
Figure 5A:
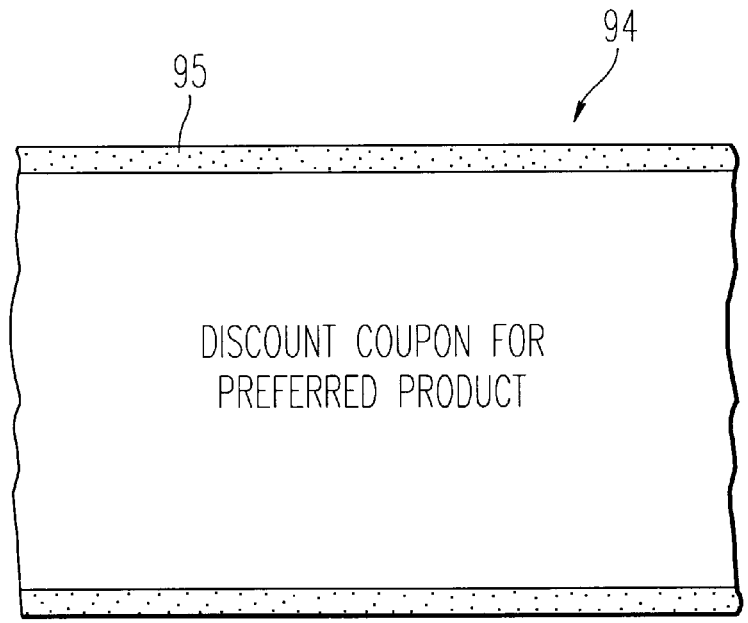
FIG. 5a shows a coupon having a border along the preformed edges of the printer paper.

In the process of coupon creation, the files 14 are used as illustrated in simplified form in FIG. 2. The coupon look-up file 32 includes records of two types: coupon index records, indicated at 40, and coupon deal records, indicated at 42. When a product in the customer's purchase transaction is detected as a triggering item, by detection of the trigger flag 43 in the item record 44 for that product, the system is able to locate a coupon index record corresponding to the triggering product, as indicated by the arrow 45. The coupon index record 40 contains an item code (i.e., there is a unique coupon index record for every triggering product), and it also contains at least one coupon look-up number (CLU). The CLU provides a link to at least one coupon deal record 42, as indicated by the arrows 46. This structure allows a particular triggering product to trigger the printing of one or more coupons having borders 94, as shown in FIG. 5a, which may pertain to different groups of products, and it allows different triggering products to trigger the printing of a coupon having a border 94 for a single product group. Each coupon deal record 42 contains the details of a particular coupon deal, including the value of the discount, the dates of validity of the deal, a message to be printed on the coupon, and various counts recording the activity of the coupon deal.

File Formats

The coupon look-up file includes two types of record: the coupon index record (CIR) and the coupon deal record (CDR). Both types of record begin with a six-byte key in the following format:

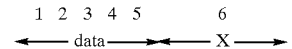

The X field indicates the record type. For instance, if X=00, the record could be a coupon index record, and, if X=01, the record could be a coupon deal record. The five-byte data field is different for each of the two record types, as will be apparent from the following formats. The coupon index record format can be as follows:

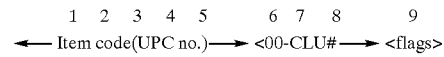

The item code contains the Uniform Product Code for the product, in binary form. The sixth byte identifies the record as a coupon index record. The CLU# provides a link between a triggering product and a particular coupon deal record. To allow the purchase of one product to trigger more than one coupon deal, a coupon index record may contain additional CLU# fields and flag fields, following the format illustrated above. Accordingly, the purchase of one product can trigger the printing of more than one coupon.

The individual bits in the flag field of the coupon index record have the following meanings, where bit 7 is the most-significant bit and bit 0 is the least-significant bit:

Bit 7—Log only (print inhibited),

Bit 6—High priority coupon,

Bit 5—Minimum balance due applies,

Bit 4—Trigger bit,

Bits 3-0—Trigger item sequence no. (1–9).

The trigger bit is a copy of the trigger bit contained in the item record. However, the item record may have its trigger bit reset during routine maintenance, and the trigger bits in the coupon index record are copied back into the item records on a regular (such as daily) basis. The log-only flag is used to inhibit printing, and it may be used to monitor the number of coupons that would have been created by the use of a particular triggering product. The high-priority flag enables coupon printing immediately upon detection of the triggering product in a customer's order. For a low priority coupon, printing is deferred until the entire order has been processed. The flag relating minimum balance due permits printing to be inhibited unless a minimum balance due is reached in the customer order. Finally, the trigger item sequence number is a digit that can be used to identify the triggering product in cases where the same coupon deal is triggered by the purchase of different products. The trigger item sequence number is printed on the coupon that is created, and it may therefore be used upon redemption of the coupon to create an appropriate log record permitting analysis of which triggering items resulted in coupon-discounted sales.

It will be noted that the coupon index record has a length of from nine to fifteen bytes. The trigger flat in the first flag byte of the record is the only one used—i.e., the trigger bits in flag bytes for any additional CLU's are not used. The CLU# field may be zeroed out to denote that the triggering product is no longer linked to a particular coupon deal.

Each coupon deal record contains the details of a coupon to be printed. The format is as follows:

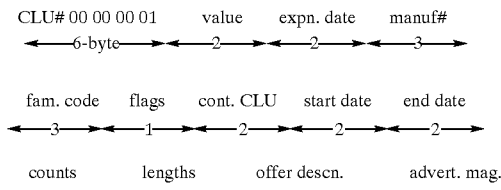

The value field contains the coupon discount amount, and the manufacturer's code is a number that uniquely identifies the manufacturer of the products for which the coupon provides a discount. Each coupon deal relates either (1) to a discount on a particular product or (2) to a discount on any of a family of products, the family codes being assigned by the manufacturer. A discount could apply, for example, to all sizes of a product, or to any group of related products.

The expiration date contains a number indicative of the date of expiration of the coupon. This can be a validity period in days from the coupon printing date, or the number of days from some fixed time reference. The start and end dates are also measured in numbers of days from the same reference, modulo 1000, and they indicate the period during which the coupon deal extends—i.e., the period during which coupons will be printed.

The continuity CLU field defines another coupon deal that is linked to the first coupon deal. The CLU field can be used to trigger the printing of another coupon when the original one is redeemed. The field is zero if there is no such linked coupon deal. The "lengths" fields are four one-byte fields, each defining the length of one line of text in the offer description and the advertising message that follow.

The "counts" fields are four separate two-byte fields to record counts of the total number of coupon triggered, the total number of coupons printed, the total number of coupons redeemed, and the total number of coupons misredeemed. The counts are used for purposes of analysis of coupon usage, both in the coupon creation and coupon redemption phases.

The flag field of the coupon deal record contains only three meaningful bits of information. Specifically, the flag bits have the following meanings when set to a one state:

Bit 7—log only (print inhibited),

Bit 6—free coupon (no charge for item),

Bit 5—expiration date of the validity period.

When bit 5 is set, the expiration date indicates the number of days beyond the printing date that the coupon is to remain valid. If bit 5 is not set, the expiration date indicates the number of days beyond a preselected reference date that the coupon is to remain valid.

The coupon log file is a sequential file into which a new record is written whenever a coupon is printed or a coupon is redeemed. The format of the log file record is as follows:

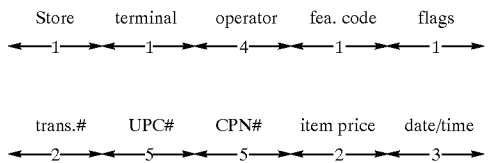

The store number field contains a relative store number. A value 01 indicates a local store and a value 02 indicates a backup store. This code is not critical to the invention, and it relates to the use of a back-up store controller (at another store) to control check-out operations. The terminal number indicates the check stand at which the transaction took place. The function code field has the following possible meanings:

| | |
|---|---|
| F1 (hexadecimal) | coupon creation |
| F2 | redemption, |
| F3 | store support procedure entry |
| | The flags field has the following meanings |
| 30 (hexadecimal) | free coupon, |
| 40 | no-sale redemption, |
| 20 | continuity linked (if creation), or coupon value entered manually (if redemption), |
| 10 | voided redemption, |
| OF | reason code. |

The low four bits of the flag field are used to record a reason for non-printing or misredemption of a coupon. The various reasons can, for instance, be as follows, where the four-digit value represents the binary state of the field.

| | A Coupon printing: |
|---|---|
| 0000 | printed, |
| 1000 | print inhibited store-wide |
| 1001 | print inhibited at this lane, |
| 1010 | print inhibited for this CLU#, |
| 1011 | print inhibited for this item, |
| 0100 | unable to access coupon index record, |
| 0101 | unable to access coupon deal record, |
| 0010 | transaction below threshold, |
| 0001 | duplicate CLU#, |
| 1100 | printing disabled by operator. |
| | B. Misredemption: |
| 0000 | normal redemption, |
| 0001 | item not in order, |

-continued

| | |
|---|---|
| 0010 | expiration date exceeded |
| 0100 | match only in manufacturer number, |
| 1000 | accepted (validation disabled). |

The date/time of the transaction are recorded in the form MMDDHH, where MM is the month, DD the day of the month, and HH the hour of the day. The CPN# field is used to record the entire set of data read from a printed coupon, and the UPC# field records (1) the triggering product code in the case of coupon creations and (2) the purchased product code in the case of redemptions.

Hardware and Software Overview

The hardware used in this invention is conventional for point-of-sale systems. Various manufacturers supply point-of-sale equipment, and the invention is not limited to any particular configuration. By way of example, the invention is presently implemented using the International Business Machines Corporation (IBM) 4690 Store Program. The store controller 10 is an IBM 4690, and the terminals 12 are IBM 4693 terminals. The IBM 4693 terminal incorporates a customer receipt station which can be used to print the aforesaid coupon or incentive designs and receipts.

IBM supplies a software operating system for use in controlling operations in the hardware described. The operating system is referred to as the IBM 4690 Store System. The IBM 4690 Store System is a general purpose machine which can be used in many retail environments. In this particular environment the IBM 4690 Store System operates according to a specific software application, namely, the IBM 4690 Supermarket Application. Communication between the terminals and the store controller is accomplished using a number of communication protocols such as ethernet, token ring or store loop.

All of these aspects of the invention hardware and software are well known and well defined in trade literature and IBM technical literature. For further information, a useful starting point is the publication "IBM 4690 Store System Programming Guide," (SC30-3517-04) published by IBM, Dept. E35, P.O. Box 12195, Research Triangle Park, N.C. 27709.

The printer hardware used in this invention can be any conventional printer capable of thermally activating heat sensitive paper. The thermally capable printer 24 includes a fixed segmented printing head which contains individual heating segments. The fixed segmented printing head spans the width of the paper. Each heating segment can be independently heated so as to be able to heat activate the chemicals or dyes present in the paper. Data from the coupon deal record is used to format the fixed segmented printing head of the thermally capable printer. Heating segments of the fixed segmented printing head of the thermally capable printer 24 located in a central region of the printing head print the details of the particular coupon or incentive deal from the coupon deal record 42. Heating segments located near the outer edges of the fixed segmented printing head print the border of the coupon. Such printer hardware is manufactured, for instance, by IBM model number 4116 thermal printer.

Figure 5B:
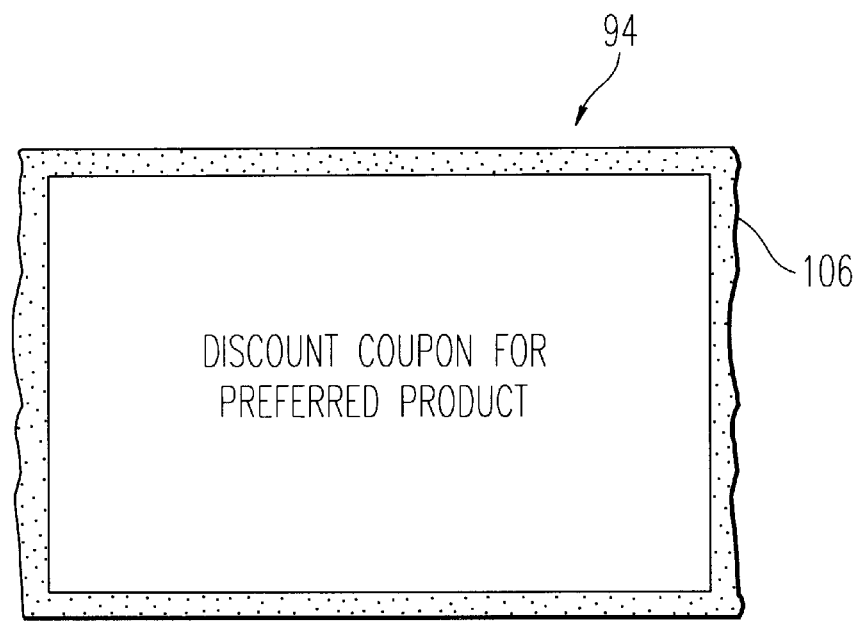
FIG. 5b shows a coupon having a border encompassing the text of the coupon.
Figure 7A:
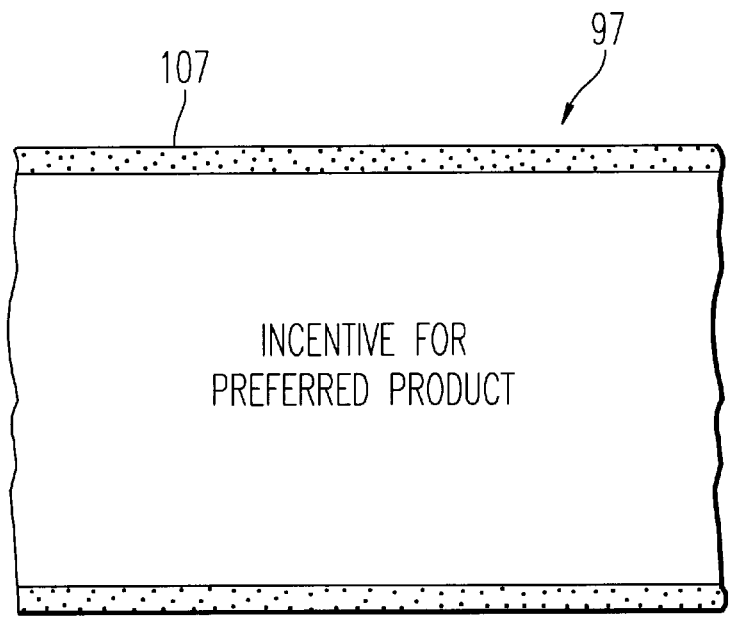
FIG. 7a shows an incentive having a border along the preformed edges of the printer paper.
Figure 7B:
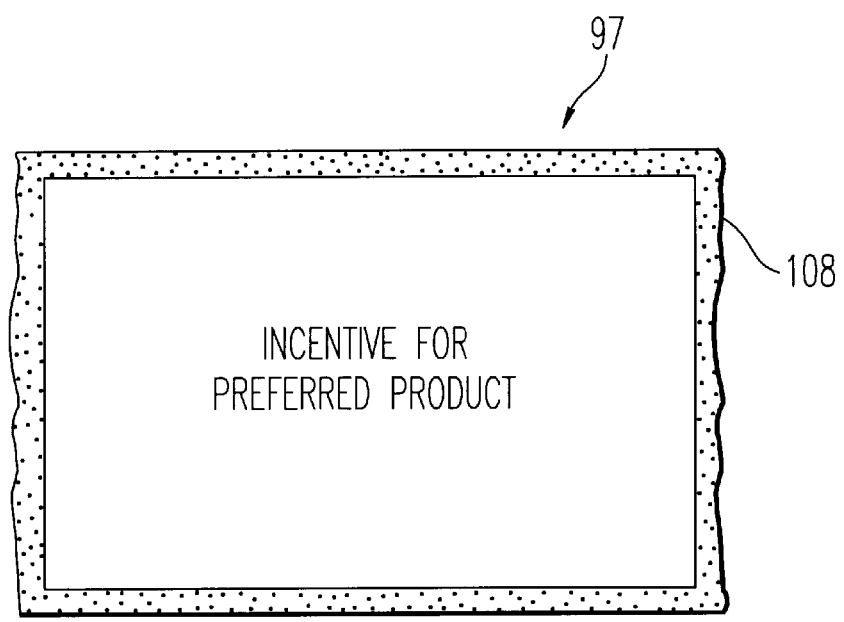
FIG. 7b shows an incentive having a border encompassing the text of the incentive.

The paper which is used to create the coupon contains a thermally activated dye or chemical which, when subjected to the heat of the thermal printer, changes the color of the paper from the original, base color of the paper. In such a case the details of the coupon and the color of the border are the same color. Typically, such paper is embedded with one chemical to produce one color upon activation. Using such paper the coupon 94 can have a border 95 as shown in FIG. 5a. Depending on the formatting of the printer the coupon 94 can have a border 106 as shown in FIG. 5b. The coupon 94 as shown in FIG. 5b can only be created when a single chemical or dye is embedded in the paper, since the border encompasses the text of the coupon and is thus activated by the same chemical dye. Incentives 97 printed according to the method are shown in FIGS. 7a and 7b having borders 107, 108, respectively.

A different chemical or dye can be impregnated in the border region of the paper so that the resulting coupon has a border of one color and the details of the coupon are of another color. The color of the border may be any color. Typically, the color of the activated dye or chemical producing the details of the coupon is the color black, and the color of the activated dye or chemical producing the border is the color red. Use of such paper results in coupons 94 as shown in FIG. 5a and incentives 97 as shown in FIG. 7a. Such paper is manufactured, for instance, by Ludlow Technical and designated CMC II thermal roll. Conventional software is used to control the printer.

Coupon Creation

Figure 4B:
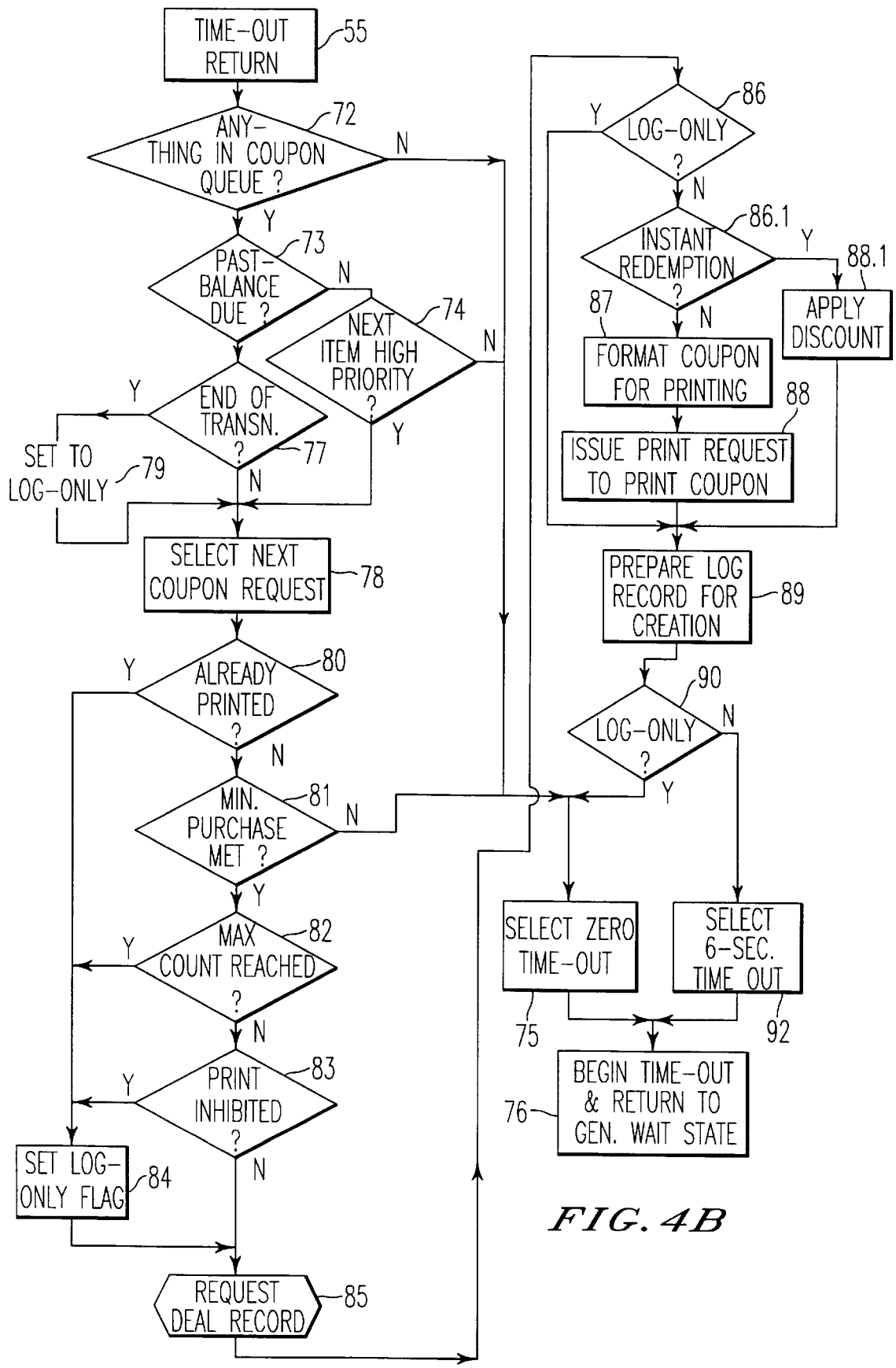
FIG. 4b is a simplified flow chart showing the functions performed in processing queued coupon printing requests during coupon creation.

The coupon creation functions performed by the terminals 12 and the controller 10 are shown in FIGS. 3, 4a and 4b. FIG. 3 illustrates a "general wait state" of the terminal, wherein the terminal software cyclically checks to determine whether any processing is required. Once processing is initiated to a certain stage, a return is made to the general wait state, as will be further explained below. However, the printing of coupons may precede the printing of the receipt, or the printing of the receipt may precede the printing of the coupons. Coupon creation as described below is of a preferred embodiment, but the invention in not limited to such an embodiment.

The first illustrated block of the general wait state poses the question whether there is any input data to process, as indicated at 50. The input data typically takes the form of bar code scanner input, but may also include keyboard input from the terminal operator. If there is input data to process, the terminal departs from the general wait state and enters an input program sequence, as indicated at 51. If there is currently no input data to process, the next test, posed in block 52, is whether a requested response has been received from the controller 10. As will be described below, each of the terminals 12 frequently makes requests to the controller 10 for file access. The requesting program returns control to the general wait state, to await arrival of the response. If a response has been received, control is transferred to a response return point, as indicated at 53. The response return point sequentially follows the point in the program from which the file access request was made to the controller.

If no response has been received from the controller 10, the next question posed in the general wait state is whether a preselected time-out is complete, as indicated at 54. As will be described, a time-out is initiated after each coupon printing request, to ensure that the coupon printing function does not totally occupy the time of the terminal printer. In the equipment presently employed to implement the invention, coupons are printed at a separate station of the printer, but employing a print head shared by other print stations. In this manner, separate printed documents can be generated at the separate stations, but the single print head behaves in effect like a single printer. Printing of too many coupons can preclude or limit printing of a customer receipt. When the time-out is completed, return is made to the program that initiated the time-out, as indicated at 55. If the time-out is not yet complete, control is transferred back to the beginning of the general wait state loop.

In the input processing steps, shown in FIG. 4*a*, only the purchase and coupon creation functions are shown. If the input involves coupon redemption, as determined in block 58, control is transferred to the redemption processing functions (not shown). Otherwise, the first step of input processing is to obtain the product code input to the terminal, as indicated in block 60. Then a request is made to the controller 10 for the item record corresponding to the input product code. The request for this record, indicated at 61, is one of a number of such requests made to the controller during the input process. In each case, after the request is transmitted to the controller 10, a return is made to the general wait state shown in FIG. 3, to await the return of the response from the controller. When the response is received, the wait state loop of FIG. 3 transfers control back to the input sequence, at a point immediately following block 61.

Next, as shown at 62, a print request is issued to initiate printing of a line on the customer receipt. The print request results in the storing of printable data in a print queue. One unction of the system software associated with the terminal is (1) to take printable information from the print queue on a first-in-first-out basis, and (2) to print it using the terminal printer.

Up to this point in the input processing, the functions performed are conventional ones that take place regardless of whether any coupon creation is to occur. In the next step, shown at 63, a check is made to determine whether the trigger flag is set in the item record being processed. If the trigger flag is set, a request is made to the controller 10 for the corresponding coupon index record, as indicated at 64. If this is a normal triggering arrangement, as described in U.S. Pat. No. 4,723,212, the coupon look-up number or numbers (which is or are stored in the coupon index record) is or are placed as a coupon request in a coupon queue, as indicated at 65, together with the flags associated with each coupon look-up number in the coupon index record. If the item is one product in a multiple-trigger coupon deal, and if the item is not also the subject of a separate normal triggering arrangement, the step of storing a coupon request in the coupon queue will be bypassed.

Regardless of whether this is a "normal" triggering product, a "negative" coupon trigger, or one of multiple triggers, the occurrence of the triggering product is saved in trigger item list for this transaction, for use at the end of the transaction in processing the negative and multiple triggers so that a coupon (either a coupon having a border or a coupon not having a border) will be printed.

One of the flags associated with the coupon index record is, of course, the printing priority flag, and this determines the position in which the coupon request will be placed in the coupon queue. High priority coupons are entered behind any already queued high-priority coupons and ahead of any low-priority items, while low-priority items are entered at the bottom or end of the coupon queue. After entry of a coupon request in the coupon queue, return is made to the general wait state, as indicated at 66.

If a product being processed has no coupon trigger flag, as determined in the block 63, there is still a possibility that a coupon should be printed during the current transaction. The store has the option of printing a default coupon having no border if no other coupons are printed in a transaction—usually also provided that a minimum purchase requirement is met. Also, negative and multiple-trigger coupons having borders have to be processed at the end of the transaction. First, a check is made, in the block 67, to determine whether the transaction has advanced to the point where the balance due has been registered on the terminal—i.e., where all items have been input and processed. If the balance-due point has not been reached, control is transferred to the block 66, to return to the general wait state. If the balance-due point has been reached, control is next transferred to a supplementary processing program 67.1 illustrated in FIG. 4*c*. This supplementary processing program, to be discussed below, handles negative coupons and multiple-trigger coupons. When the supplementary processing is complete, return is made to the block 68, which poses the question whether any coupons at all have been printed during the entire transaction. If not, a store default coupon having no border is stored in the coupon queue, as indicated at block 69, before a return is made to the general wait state.

Input processing proceeds in the manner shown in FIG. 4*a*, with coupon requests being placed in the coupon queue as corresponding triggering items are detected in the transaction. The process by which coupon requests are removed from the coupon queue is shown in FIG. 4*b*.

The supplementary processing of triggering items is shown functionally in FIG. 4*c*. First, as shown at block 70.1, access is obtained to a list of triggering items recorded for this particular transaction. Then the question is posed, as indicted in block 70.2, whether any negative coupon deal is in effect. If so, the list of triggering items is examined, in block 70.3, to determine whether any negative trigger item was not purchased during this particular transaction. The absence of a negative triggering item from the list results in the storing of a coupon request, in block 70.4. If no negative coupon deals are in effect, as determined in block 70.2, or if the terms of a negative trigger deal are not satisfied, as determined in block 70.3, or following the storing of a coupon request, in block 70.4, control is transferred to block 70.5, which determines whether there are any multiple-trigger deals in effect. If there are none, an exit is made from this processing program, as indicated at 70.6. If there is at least one multiple-trigger deal in effect, the terms of the deal are examined, as indicated in block 70.7, which is expanded in FIG. 4*d*. If the terms of the deal are satisfied, a coupon request is stored in the coupon queue, as shown in block 70.8, and control is transferred back to the block 70.5 to check for additional multiple-trigger coupon deals. If the terms of the multiple-trigger coupon deal are not satisfied, the block 70.8 is bypassed. It will be understood that there may be a number of multiple-trigger coupon deals in effect at the same time in a particular store. This will require multiple passes through the logic of FIG. 4*c*. In other words, exit from the processing program, at 70.6, is made only after returning to block 70.5 to determine whether any further multiple-trigger deals remain to be processed.

In determining whether the terms of a multiple-trigger deal have been satisfied, it is first determined, in block 71.1 (FIG. 4*d*), whether a trade event deal is in effect. If so, the trigger item list for this transaction is scanned for compliance with the deal conditions. A trade event deal may involve the purchase of any predetermined number of items in a predefined trade group of products. If the terms of the trade event deal are satisfied, as indicated in block 71.3, the affirmative exit is taken from the processing program, as indicated at 71.4. If not, the negative exit from the program is taken, as indicated at 71.5. If no trade event deal is in effect, it is assumed that a simpler form of a multiple-trigger coupon is in effect. The trigger item list is scanned, in block 71.6, to accumulate a count of the number of trigger items purchased, or the total dollar amount purchased, as desired. If the requirements are met, as determined in block 71.7, the affirmative exit is taken (71.4). Otherwise, the negative exit (71.5) is taken.

After completion of input processing, as described with reference to FIGS. 4a, 4c, and 4d, a return is always made to the general wait state, as indicated at 66 in FIG. 4a. Processing of the coupon queue proceeds in accordance with the flow chart of FIG. 4b. After a return from a time-out, from the general wait state, the coupon queue is first checked, as shown at 72, to determine whether there are any coupon requests waiting to be processed. If there are, the next question posed, in block 73, is whether the balance-due point has been reached in the transaction. If it has not, the only coupons eligible for printing are high priority coupons. This is determined in block 74. If there are no items in the coupon queue, or if there are only low-priority items and the balance-due point has not been reached, control is transferred to block 75, which selects a zero or near-zero time-out period. Then, in block 76, the time-out is initiated and a return is made to the general wait state. Control will very soon pass back again from the general wait state, to check the condition of the coupon queue once more.

If the balance-due point has been reached, as determined in block 73, the next test, in block 77, is to determine whether the end of the transaction has been reached—that is, whether the terminal operator has received payment for the sale and has closed out the transaction in preparation for beginning a new one. If this has not occurred, control is passed to the next step, at block 78, to select the next unprocessed item in the coupon queue. If the end of the transaction has been reached, however, a log-only flag is set, in block 79, before passing to block 78. Control also passes to block 78 if a high priority coupon creation request is detected in block 74.

At this point, a coupon creating candidate has been selected from the coupon queue, but it is still subject to a number of further tests before an actual print request is made to print the coupon. First, in block 80, a check is made to determine if the same coupon has already been printed in this transaction. Only one coupon of the same coupon look-up number is normally permitted for each transaction. Next, if there have been no previous coupons of the same kind, a check is made in block 81 to determine whether a minimum purchase threshold has been reached. For each coupon deal, there is an option to prevent printing of the coupon if a designated (storewide) total purchase minimum is not reached. If the answer obtained from block 81 is negative, control is transferred to block 75, to exit to the general wait state, but without removing the coupon request from the coupon queue. The next time the coupon is processed, the total purchase amount is again checked. If the coupon is never printed, because the threshold purchase amount is not reached by the end of the transaction, a log record is created for the coupon.

In block 82, a check is made on the total count of coupons printed for this transaction. If the number exceeds a maximum set for this particular checkout terminal, no further printing of coupons is permitted. In addition, printing is not permitted if a print inhibit flag has been set, as determined in block 83. If printing is inhibited, or if the maximum coupon count is reached, or if the coupon has been printed already, then the log-only flag is set, as indicated in block 84, before advancing to the step shown in block 85, in which the complete coupon deal record, corresponding to the currently processed coupon queue entry, is requested from the controller 10.

Next, if the log-only flag is not set, as determined in block 86, a determination is made, in block 86.1, whether the coupon deal calls for an instant redemption—i.e., the application of a discount without the printing of a coupon. If no instant redemption is called for, the coupon is formatted for printing, as indicated in block 87, using the information obtained from the coupon deal record. Then a print request is issued, as indicated in block 88, to place in the print queue the printable data that is to appear on the coupon. This data will include bar code data that will result in the printing of a coupon with pertinent information encoded in bar code form. If instant redemption is called for, as determined in block 86.1, a discount is applied directly to the customer's bill, as indicated in block 88.1, and blocks 87 and 88 are bypassed to avoid printing a coupon. The amount of the discount may depend on the number of trigger items (in multiple-trigger coupon deals) or on other factors predefined for the coupon deal.

Figure 6:
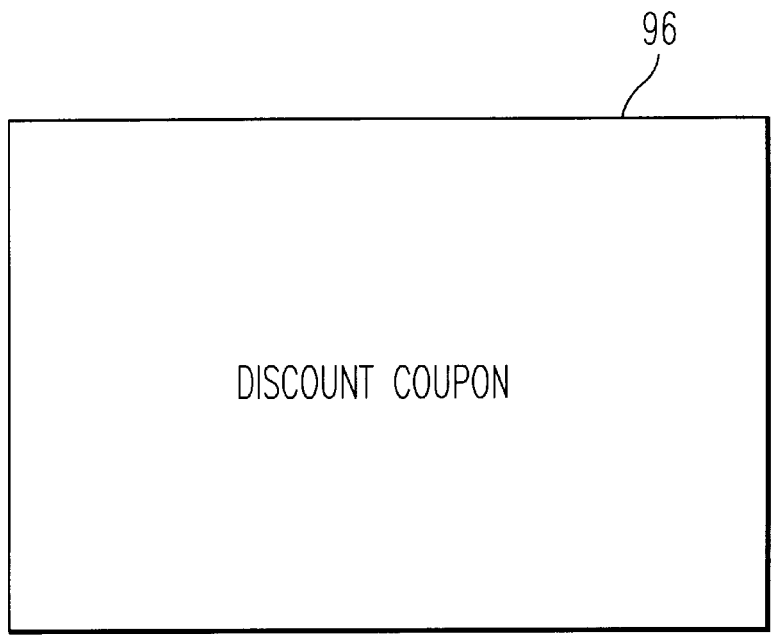
FIG. 6 shows a coupon without a border.

Data from the coupon deal record (such as the flag, as described earlier) is used to format the thermally capable printer 24 to print a border 95 around the preferred coupon 94 as shown in FIG. 5. Preferably, the border 95 of the coupon having a border 94 is colored red so as to catch the eye of the consumer. The flag of the coupon deal record activates the thermal capabilities of the thermally capable printer 24 so as to create the border 95 around the coupon. Other coupons printed by the thermally capable printer 24 do not have a border and appear as coupon 96, as shown in FIG. 6. The coupon 96 is printed due to the request made at block 69 of FIG. 4a. As such, the block 69 does not transmit the necessary formatting information to the thermally capable printer 24 so as to print a border around the coupon. The thermally capable printer 24 is able to print a border around the preferred coupon 94 because the printer paper contains a thermally activated dye or chemical border which changes color upon the selective application of heat to produce a border around the coupon 94 of preferred products.

The next step, shown at block 89, is to prepare a log record of the coupon creation, or in the case of log-only situations, to create a log record of a coupon request that did not result in printing of a coupon. The log-only flag is checked again in block 90, after the logging step of block 89. If the log-only flag is set, control is transferred to block 75, to set a zero time-out and then to return to the general wait state. If the log-only flat is not set (i.e., coupon is to be printed), a short (e.g., six-second) delay or time-out is selected, in block 92, before returning to the general wait state through block 76. The time-out ensures that the printer will not be totally occupied with the coupon printing function, but will be free for the next period of time to print other material, such as portions of the customer receipt.

An important aspect of coupon creation is that one of the fields printed on the coupon in bar code form is a trigger item sequence number, obtained from the coupon index record flags. This number identifies the triggering product or item, and it can be used to compile statistics relating the printed coupon to the items that triggered its printing. The other fields of data printed on the coupon in bar code form include the coupon value, the expiration date, the manufacturer's code, and the product family code to which the coupon deal applies. Printed on the coupon in human-readable form are the offer description and the advertising message, as well as some of the information also printed in bar code form.

File Maintenance

Maintenance of the controller files used in coupon creation and redemption is effected by means of a sequential maintenance file, which may be prepared at a site remote from the store, and then processed at the store controller to effect the desired changes in the files. The maintenance functions include (1) adding, deleting, or replacing coupon deal records and coupon index records, (2) enabling and disabling coupon triggering by item, (3) enabling and disabling coupon printing by item, (4) copying the coupon by file, and (5) retrieving the coupon counts. Other functions include (1) reorganizing the coupon-look-up file, (2) clearing the file before a reload, and (3) adding or replacing system configuration data. The latter function includes (1) enabling or disabling coupon creation by coupon deal, (2) enabling or disabling printing by store or checkout lane, (3) enabling or disabling coupon validation but continuing to log redemptions and misredemptions, (4) updating a per-transaction coupon maximum, by checkout lane, and (5) updating a transaction threshold.

The format of the maintenance file can, for instance, be as follows:

```
Command 1 (one byte)
Data
. . .
Data
Data
End-of-data record
Command 2
Data
. . .
. . .
End-of-data record
. . .
. . .
End-of document record
```

Four commands do not require accompanying data. These are commands to reorganize the coupon look-up file, create a report log, report all coupon counts, and clear the coupon look-up file for a reload.

The specific formats for effecting these maintenance commands is not critical to the present invention. Any desired programing approach may be employed to make changes to the controller files as desired.

Figure 10:
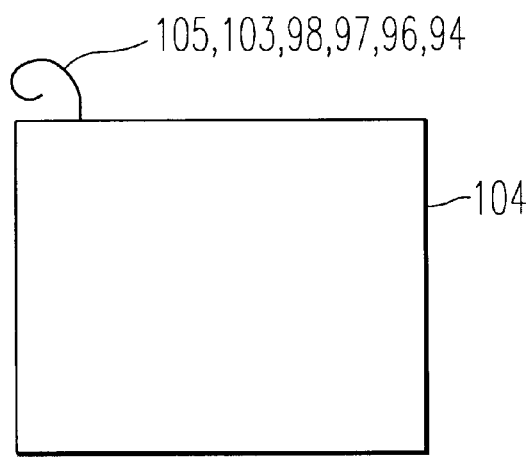
FIG. 10 shows a transaction device.

In another form of the invention, as shown in FIG. 10, the components consist of at least a single stand-alone transaction device 104. The transaction device 104 contains a thermally capable printer, a transaction reading device such as a bar type code reader and/or credit card reader, and associated files and controllers similar to the first embodiment so as to compare the details of a transaction to stored triggering values so as to command the thermally capable printer to print a coupon or other like incentive having a border or not having a border.

Figure 8:
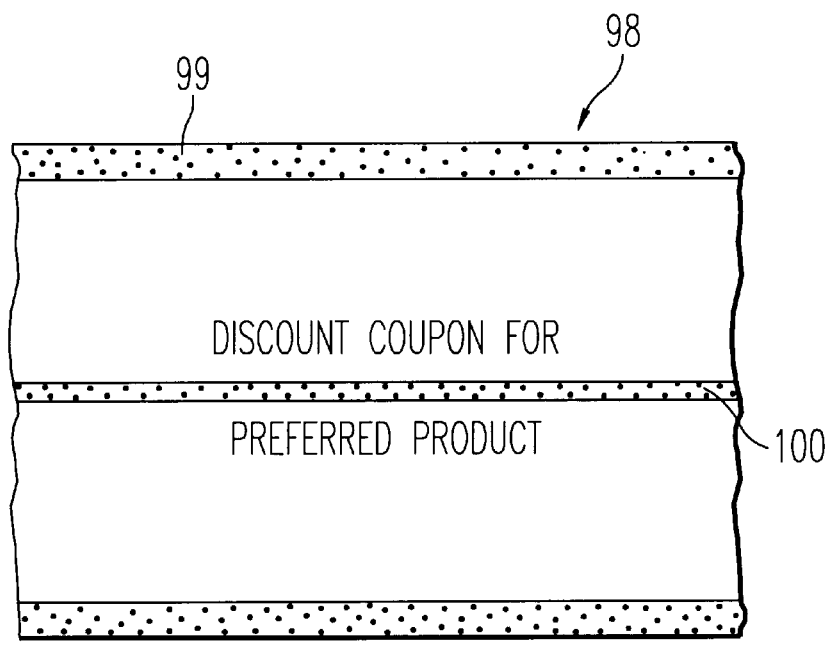
FIG. 8 shows a coupon having a border and a watermark.
Figure 9:
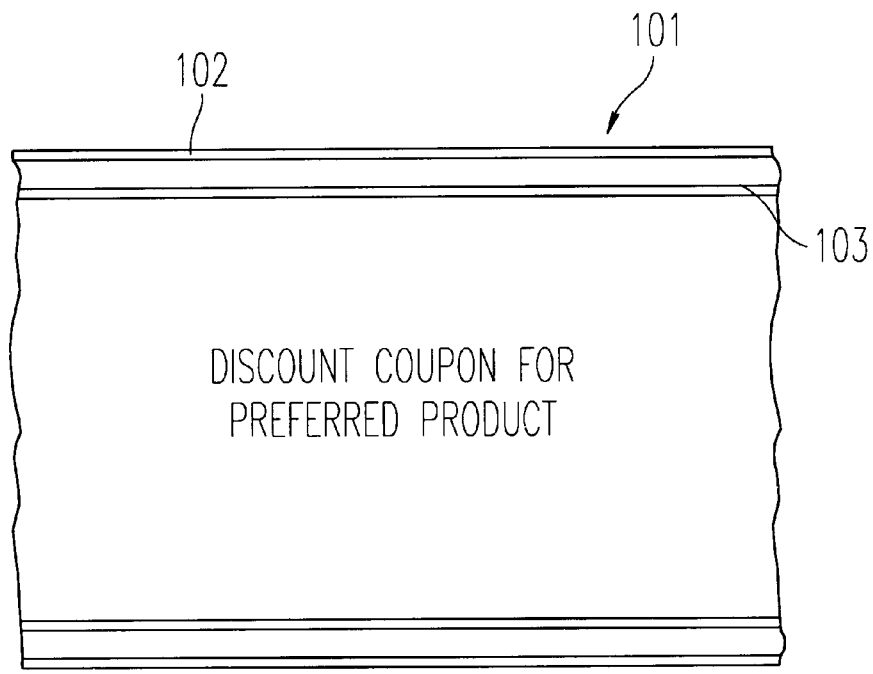
FIG. 9 shows a coupon having multiple borders.

As in the previous embodiment the coupon 94 can have a border as shown in FIGS. 5a and 5b and the incentive 97 can have borders as shown in FIGS. 7a and 7b. FIG. 6 shows a coupon 96 not having a border. FIG. 8 shows a coupon 98 having a border and a watermark. FIG. 9 shows a coupon 101 having multiple borders. The colored borders can be of any color, however, the colored border of the coupon as shown in FIG. 5b and the incentive as shown in FIG. 7b are limited to the same color as the text of the coupon or incentive, respectively.

The transaction device 104 compares the details of the transaction to the stored triggering values. For example, a bordered coupon or like incentive can be printed in response to: a product purchased or not purchased, the dollar amount of the transaction, the number of products purchased, the form of payment (such as cash, a credit card, a debit card, or a frequent shopper card), and what the source of a credit card or a debit card is, etc.

The thermally capable printer of the transaction device 104 also prints the receipt 105, which does not have a border.

The printer paper, as in the previous embodiment, contains at least one thermally activated dye or chemical which changes color upon the selective application of heat to produce a border of at least one color around the coupon or other like incentive. The border can be any color. Multiple borders 102, 103 can be used as shown in FIG. 9. Additionally, a watermark 100 can be included with the border 99 on the coupon 98.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. For use in a retail store point-of-sale system having
   (a) at least one terminal at a customer checkout location with means for reading product codes on purchased items in a customer order and
   (b) a store controller with which the terminal can communicate, the store controller having access to an item record file containing price and other information for each product item, a method for printing a redeemable coupon in response to the purchase of at least one triggering item or the non-purchase of at least one triggering item, the method comprising the steps of:
   (c) preselecting a discountable product for which a discount coupon is to be printed;
   (d) preselecting at least one triggering product, the purchase of which or the failure to purchase of which is intended to initiate the printing of a discount coupon;
   (e) storing the terms of at least one coupon deal relating to the discount coupon to be printed;
   (f) identifying the triggering product in the customer order;
   (g) associating the triggering product with the previously stored terms of the coupon deal; and
   (h) automatically printing at least one discount coupon having a border for the discountable product, based on the details of the coupon deal and without the intervention or participation of the customer other than in purchasing or in failing to purchase the triggering product.

2. A method as defined by claim 1, wherein the step of automatically printing at least one discount coupon automatically prints the border of the coupon in the color red so as to be more noticeable to an eye of the customer.

3. A method as defined by claim 1 and further comprising the step of printing at least one discount coupon not having a border as set by default by the retail store without the intervention or participation of the customer other than in not purchasing the at least one triggering product.

4. A method as defined by claim 1 and further comprising the step of determining the details of the coupon deal based on the number of triggering products purchased.

5. A method as defined by claim 1 and further comprising the step of determining the details of the coupon deal based on the dollar amount of the purchase.

* * * * *